US008352433B2

(12) United States Patent
Crescenti et al.

(10) Patent No.: US 8,352,433 B2
(45) Date of Patent: *Jan. 8, 2013

(54) MODULAR BACKUP AND RETRIEVAL SYSTEM USED IN CONJUNCTION WITH A STORAGE AREA NETWORK

(75) Inventors: John Crescenti, Freehold, NJ (US); Srinivas Kavuri, Highland Park, NJ (US); David Alan Oshinsky, East Brunswick, NJ (US); Anand Prahlad, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/702,716

(22) Filed: Feb. 9, 2010

(65) Prior Publication Data

US 2010/0138393 A1  Jun. 3, 2010

Related U.S. Application Data

(63) Continuation of application No. 11/356,467, filed on Feb. 15, 2006, now abandoned, which is a continuation of application No. 09/610,738, filed on Jul. 6, 2000, now Pat. No. 7,035,880.

(60) Provisional application No. 60/143,743, filed on Jul. 14, 1999, provisional application No. 60/143,744, filed on Jul. 14, 1999, provisional application No. 60/179,345, filed on Jan. 31, 2000.

(51) Int. Cl.
*G06F 7/00* (2006.01)
(52) U.S. Cl. .......................... 707/652; 707/654; 709/203
(58) Field of Classification Search .................. None
See application file for complete search history.

(56) References Cited

U.S. PATENT DOCUMENTS 4,296,465 A  10/1981  Lemak
4,686,620 A  8/1987  Ng
(Continued)

FOREIGN PATENT DOCUMENTS

EP  0 259 912  3/1988
(Continued)

OTHER PUBLICATIONS

Armstead et al., "Implementation of a Campus-wide Distributed Mass Storage Service: The Dream vs. Reality," IEEE, 1995, pp. 190-199.

(Continued)

*Primary Examiner* — Christyann Pulliam
*Assistant Examiner* — Daniel Kuddus
(74) *Attorney, Agent, or Firm* — Knobbe, Martens, Olson & Bear, LLP

(57) ABSTRACT

A modular computer storage system and method is provided for managing and directing data archiving functions, which is scalable and comprehends various storage media as well as diverse operating systems on a plurality of client devices. A client component is associated with one or more client devices for generating archival request. A file processor directs one or more storage devices, through one or more media components, which control the actual physical level backup on various storage devices. Each media component creates a library indexing system for locating stored data. A management component coordinates the archival functions between the various client components and the file processor, including setting scheduling policies, aging policies, index pruning policies, drive cleaning policies, configuration information, and keeping track of running and waiting jobs.

14 Claims, 3 Drawing Sheets

U.S. PATENT DOCUMENTS

| | | | |
|---|---|---|---|
| 4,751,639 A | 6/1988 | Corcoran et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,204,958 A | 4/1993 | Cheng et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,265,159 A | 11/1993 | Kung | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,351 A | 4/1994 | Jippo | |
| 5,311,509 A | 5/1994 | Heddes et al. | |
| 5,321,816 A | 6/1994 | Rogan et al. | |
| 5,333,251 A | 7/1994 | Urabe et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,426,284 A | 6/1995 | Doyle | |
| 5,448,724 A | 9/1995 | Hayashi et al. | |
| 5,455,926 A | 10/1995 | Keele et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,555,404 A | 9/1996 | Torbjornsen et al. | |
| 5,559,957 A | 9/1996 | Balk | |
| 5,559,991 A | 9/1996 | Kanfi | |
| 5,574,898 A | 11/1996 | Leblang et al. | |
| 5,598,546 A | 1/1997 | Blomgren | |
| 5,613,134 A | 3/1997 | Lucus et al. | |
| 5,615,392 A | 3/1997 | Harrison et al. | |
| 5,619,644 A | 4/1997 | Crockett et al. | |
| 5,638,509 A | 6/1997 | Dunphy et al. | |
| 5,642,496 A | 6/1997 | Kanfi | |
| 5,649,185 A | 7/1997 | Antognini et al. | |
| 5,659,614 A * | 8/1997 | Bailey, III | 713/165 |
| 5,673,381 A | 9/1997 | Huai et al. | |
| 5,675,511 A | 10/1997 | Prasad et al. | |
| 5,677,900 A | 10/1997 | Nishida et al. | |
| 5,682,513 A | 10/1997 | Candelaria et al. | |
| 5,687,343 A | 11/1997 | Fecteau et al. | |
| 5,699,361 A | 12/1997 | Ding et al. | |
| 5,719,786 A | 2/1998 | Nelson et al. | |
| 5,729,743 A | 3/1998 | Squibb | |
| 5,734,817 A | 3/1998 | Roffe et al. | |
| 5,737,747 A | 4/1998 | Vishlitzky et al. | |
| 5,740,405 A | 4/1998 | DeGraaf | |
| 5,742,807 A | 4/1998 | Masinter | |
| 5,751,997 A | 5/1998 | Kullick et al. | |
| 5,758,359 A * | 5/1998 | Saxon | 707/644 |
| 5,758,649 A | 6/1998 | Iwashita et al. | |
| 5,761,677 A | 6/1998 | Senator et al. | |
| 5,761,734 A | 6/1998 | Pfeffer et al. | |
| 5,764,972 A | 6/1998 | Crouse et al. | |
| 5,778,395 A | 7/1998 | Whiting et al. | |
| 5,790,828 A | 8/1998 | Jost | |
| 5,805,920 A | 9/1998 | Sprenkle et al. | |
| 5,806,058 A | 9/1998 | Mori et al. | |
| 5,812,398 A | 9/1998 | Nielsen | |
| 5,812,748 A * | 9/1998 | Ohran et al. | 714/4.5 |
| 5,813,009 A | 9/1998 | Johnson et al. | |
| 5,813,013 A | 9/1998 | Shakib et al. | |
| 5,813,017 A * | 9/1998 | Morris | 1/1 |
| 5,829,046 A * | 10/1998 | Tzelnic et al. | 711/162 |
| 5,835,953 A | 11/1998 | Ohran | |
| 5,845,257 A | 12/1998 | Fu et al. | |
| 5,860,073 A | 1/1999 | Ferrel et al. | |
| 5,860,104 A | 1/1999 | Witt et al. | |
| 5,864,871 A | 1/1999 | Kitain et al. | |
| 5,875,478 A | 2/1999 | Blumenau | |
| 5,875,481 A | 2/1999 | Ashton et al. | |
| 5,884,067 A | 3/1999 | Storm et al. | |
| 5,887,134 A | 3/1999 | Ebrahim | |
| 5,896,531 A | 4/1999 | Curtis et al. | |
| 5,897,642 A | 4/1999 | Capossela et al. | |
| 5,898,431 A | 4/1999 | Webster et al. | |
| 5,901,327 A | 5/1999 | Ofek | |
| 5,924,102 A | 7/1999 | Perks | |
| 5,926,836 A | 7/1999 | Blumenau | |
| 5,933,104 A | 8/1999 | Kimura | |
| 5,933,601 A | 8/1999 | Fanshier et al. | |
| 5,950,205 A | 9/1999 | Aviani, Jr. | |
| 5,956,519 A | 9/1999 | Wise et al. | |
| 5,956,733 A | 9/1999 | Nakano et al. | |
| 5,958,005 A | 9/1999 | Thorne et al. | |
| 5,970,233 A | 10/1999 | Lie et al. | |
| 5,970,255 A | 10/1999 | Tran et al. | |
| 5,974,563 A | 10/1999 | Beeler, Jr. | |
| 5,978,841 A | 11/1999 | Berger | |
| 5,983,239 A * | 11/1999 | Cannon | 1/1 |
| 5,987,478 A | 11/1999 | See et al. | |
| 5,991,753 A | 11/1999 | Wilde | |
| 5,995,091 A | 11/1999 | Near et al. | |
| 6,000,020 A | 12/1999 | Chin et al. | |
| 6,003,089 A | 12/1999 | Shaffer et al. | |
| 6,009,274 A | 12/1999 | Fletcher et al. | |
| 6,012,090 A | 1/2000 | Chung et al. | |
| 6,012,415 A * | 1/2000 | Linseth | 119/174 |
| 6,016,553 A | 1/2000 | Schneider et al. | |
| 6,018,744 A | 1/2000 | Mamiya et al. | |
| 6,021,415 A * | 2/2000 | Cannon et al. | 1/1 |
| 6,023,710 A | 2/2000 | Steiner et al. | |
| 6,026,414 A * | 2/2000 | Anglin | 1/1 |
| 6,026,437 A | 2/2000 | Muschett et al. | |
| 6,052,735 A | 4/2000 | Ulrich et al. | |
| 6,070,228 A | 5/2000 | Belknap et al. | |
| 6,073,137 A | 6/2000 | Brown et al. | |
| 6,073,220 A * | 6/2000 | Gunderson | 711/162 |
| 6,076,148 A | 6/2000 | Kedem | |
| 6,078,934 A | 6/2000 | Lahey et al. | |
| 6,085,030 A | 7/2000 | Whitehead et al. | |
| 6,088,694 A | 7/2000 | Burns et al. | |
| 6,091,518 A | 7/2000 | Anabuki | |
| 6,094,416 A | 7/2000 | Ying | |
| 6,101,585 A | 8/2000 | Brown et al. | |
| 6,105,037 A | 8/2000 | Kishi | |
| 6,105,129 A | 8/2000 | Meier et al. | |
| 6,108,640 A | 8/2000 | Slotznick | |
| 6,108,712 A | 8/2000 | Hayes, Jr. | |
| 6,112,239 A | 8/2000 | Kenner et al. | |
| 6,122,668 A | 9/2000 | Teng et al. | |
| 6,131,095 A | 10/2000 | Low et al. | |
| 6,131,190 A | 10/2000 | Sidwell | |
| 6,137,864 A | 10/2000 | Yaker | |
| 6,148,377 A | 11/2000 | Carter et al. | |
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,161,192 A | 12/2000 | Lubbers et al. | |
| 6,167,402 A | 12/2000 | Yeager | |
| 6,175,829 B1 | 1/2001 | Li et al. | |
| 6,189,051 B1 * | 2/2001 | Oh et al. | 709/219 |
| 6,212,512 B1 | 4/2001 | Barney et al. | |
| 6,212,521 B1 | 4/2001 | Minami et al. | |
| 6,230,164 B1 | 5/2001 | Rikieta et al. | |
| 6,249,795 B1 | 6/2001 | Douglis | |
| 6,253,217 B1 | 6/2001 | Dourish et al. | |
| 6,260,069 B1 | 7/2001 | Anglin | |
| 6,263,368 B1 | 7/2001 | Martin | |
| 6,269,382 B1 | 7/2001 | Cabrera et al. | |
| 6,269,431 B1 | 7/2001 | Dunham | |
| 6,275,953 B1 | 8/2001 | Vahalia et al. | |
| 6,292,783 B1 | 9/2001 | Rohler et al. | |
| 6,295,541 B1 | 9/2001 | Bodnar et al. | |
| 6,301,592 B1 | 10/2001 | Aoyama et al. | |
| 6,304,880 B1 | 10/2001 | Kishi | |
| 6,314,439 B1 | 11/2001 | Bates et al. | |
| 6,314,460 B1 | 11/2001 | Knight et al. | |
| 6,324,581 B1 | 11/2001 | Xu et al. | |

| | | |
|---|---|---|
| 6,328,766 B1 | 12/2001 | Long |
| 6,330,570 B1 | 12/2001 | Crighton |
| 6,330,572 B1 | 12/2001 | Sitka |
| 6,330,589 B1 | 12/2001 | Kennedy |
| 6,330,642 B1 | 12/2001 | Carteau |
| 6,343,287 B1 | 1/2002 | Kumar et al. |
| 6,343,324 B1 | 1/2002 | Hubis et al. |
| 6,350,199 B1 | 2/2002 | Williams et al. |
| 6,351,764 B1 | 2/2002 | Voticky et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,863 B1 | 3/2002 | Sayle |
| 6,360,306 B1 | 3/2002 | Bergsten |
| 6,367,029 B1 | 4/2002 | Mayhead et al. |
| 6,374,336 B1 | 4/2002 | Peters et al. |
| 6,389,432 B1 | 5/2002 | Pothapragada et al. |
| 6,396,513 B1 | 5/2002 | Helfman et al. |
| 6,397,308 B1 | 5/2002 | Ofek et al. |
| 6,418,478 B1 | 7/2002 | Ignatius et al. |
| 6,421,709 B1 | 7/2002 | McCormick et al. |
| 6,421,711 B1 | 7/2002 | Blumenau et al. |
| 6,438,595 B1 | 8/2002 | Blumenau et al. |
| 6,453,325 B1 * | 9/2002 | Cabrera et al. .................. 1/1 |
| 6,466,592 B1 | 10/2002 | Chapman |
| 6,470,332 B1 | 10/2002 | Weschler |
| 6,473,794 B1 | 10/2002 | Guheen et al. |
| 6,487,561 B1 | 11/2002 | Ofek et al. |
| 6,487,644 B1 | 11/2002 | Huebsch et al. |
| 6,493,811 B1 * | 12/2002 | Blades et al. .................. 711/203 |
| 6,519,679 B2 | 2/2003 | Devireddy et al. |
| 6,535,910 B1 | 3/2003 | Suzuki et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,546,545 B1 | 4/2003 | Honarvar et al. |
| 6,549,918 B1 | 4/2003 | Probert et al. |
| 6,553,410 B2 | 4/2003 | Kikinis |
| 6,557,039 B1 | 4/2003 | Leong et al. |
| 6,564,219 B1 | 5/2003 | Lee et al. |
| 6,564,228 B1 | 5/2003 | O'Connor |
| 6,581,143 B2 | 6/2003 | Gagne et al. |
| 6,593,656 B2 | 7/2003 | Ahn et al. |
| 6,604,149 B1 | 8/2003 | Deo et al. |
| 6,615,241 B1 | 9/2003 | Miller et al. |
| 6,631,493 B2 | 10/2003 | Ottesen et al. |
| 6,647,396 B2 | 11/2003 | Parnell et al. |
| 6,647,409 B1 | 11/2003 | Sherman et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,704,933 B1 | 3/2004 | Tanaka et al. |
| 6,721,767 B2 | 4/2004 | De Meno et al. |
| 6,728,733 B2 | 4/2004 | Tokui |
| 6,732,124 B1 | 5/2004 | Koseki et al. |
| 6,742,092 B1 | 5/2004 | Huebsch et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,871,163 B2 | 3/2005 | Hiller et al. |
| 6,874,023 B1 | 3/2005 | Pennell et al. |
| 6,886,020 B1 | 4/2005 | Zahavi et al. |
| 6,912,645 B2 * | 6/2005 | Dorward et al. .............. 711/216 |
| 6,941,304 B2 | 9/2005 | Gainey et al. |
| 6,952,758 B2 | 10/2005 | Chron et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,039,860 B1 | 5/2006 | Gautestad |
| 7,062,761 B2 | 6/2006 | Slavin et al. |
| 7,076,685 B2 | 7/2006 | Pillai et al. |
| 7,082,441 B1 | 7/2006 | Zahavi et al. |
| 7,085,904 B2 | 8/2006 | Mizuno et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,120,757 B2 | 10/2006 | Tsuge |
| 7,130,970 B2 | 10/2006 | Devassy et al. |
| 7,134,041 B2 * | 11/2006 | Murray et al. .................. 714/4.1 |
| 7,149,893 B1 | 12/2006 | Leonard et al. |
| 7,155,465 B2 | 12/2006 | Lee et al. |
| 7,155,481 B2 | 12/2006 | Prahlad et al. |
| 7,155,633 B2 | 12/2006 | Tuma et al. |
| 7,174,312 B2 | 2/2007 | Harper et al. |
| 7,194,454 B2 | 3/2007 | Hansen et al. |
| 7,246,140 B2 | 7/2007 | Therrien et al. |
| 7,246,207 B2 | 7/2007 | Kottomtharayil et al. |
| 7,269,612 B2 | 9/2007 | Devarakonda et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,315,924 B2 | 1/2008 | Prahlad et al. |
| 7,328,225 B1 | 2/2008 | Beloussov et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,380,072 B2 | 5/2008 | Kottomtharayil et al. |
| 7,386,552 B2 | 6/2008 | Kitamura et al. |
| 7,389,311 B1 | 6/2008 | Crescenti et al. |
| 7,395,282 B1 | 7/2008 | Crescenti et al. |
| 7,409,509 B2 | 8/2008 | Devassy et al. |
| 7,430,587 B2 | 9/2008 | Malone et al. |
| 7,433,301 B2 | 10/2008 | Akahane et al. |
| 7,434,219 B2 | 10/2008 | De Meno et al. |
| 7,447,692 B2 | 11/2008 | Oshinsky et al. |
| 7,454,569 B2 | 11/2008 | Kavuri et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,519,726 B2 | 4/2009 | Palliyll et al. |
| 7,529,748 B2 | 5/2009 | Wen et al. |
| 7,532,340 B2 | 5/2009 | Koppich et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,596,586 B2 | 9/2009 | Gokhale et al. |
| 7,613,748 B2 | 11/2009 | Brockway et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,685,126 B2 | 3/2010 | Patel et al. |
| 7,716,171 B2 | 5/2010 | Kryger |
| 7,734,715 B2 | 6/2010 | Hyakutake et al. |
| 7,757,043 B2 | 7/2010 | Kavuri et al. |
| 7,802,067 B2 | 9/2010 | Prahlad et al. |
| 7,840,537 B2 | 11/2010 | Gokhale et al. |
| 7,844,676 B2 | 11/2010 | Prahlad et al. |
| 7,873,808 B2 | 1/2011 | Stewart |
| 7,877,351 B2 | 1/2011 | Crescenti et al. |
| 8,041,673 B2 | 10/2011 | Crescenti et al. |
| 8,078,583 B2 | 12/2011 | Prahlad et al. |
| 8,086,809 B2 | 12/2011 | Prahlad et al. |
| 8,103,829 B2 | 1/2012 | Kavuri et al. |

| | | | |
|---|---|---|---|
| 2002/0040376 A1 | 4/2002 | Yamanaka et al. | |
| 2002/0042869 A1 | 4/2002 | Tate et al. | |
| 2002/0049626 A1 | 4/2002 | Mathias et al. | |
| 2002/0049778 A1 | 4/2002 | Bell et al. | |
| 2002/0069324 A1 | 6/2002 | Gerasimov et al. | |
| 2002/0103848 A1 | 8/2002 | Giacomini et al. | |
| 2002/0107877 A1 | 8/2002 | Whiting et al. | |
| 2002/0161753 A1 | 10/2002 | Inaba et al. | |
| 2003/0061491 A1 | 3/2003 | Jaskiewicz et al. | |
| 2003/0097361 A1 | 5/2003 | Huang et al. | |
| 2003/0172158 A1 | 9/2003 | Pillai et al. | |
| 2004/0107199 A1 | 6/2004 | Dalrymple et al. | |
| 2004/0193953 A1 | 9/2004 | Callahan et al. | |
| 2004/0205206 A1 | 10/2004 | Naik et al. | |
| 2004/0230829 A1 | 11/2004 | Dogan et al. | |
| 2005/0033800 A1 | 2/2005 | Kavuri et al. | |
| 2005/0114406 A1 | 5/2005 | Borthakur et al. | |
| 2005/0246510 A1 | 11/2005 | Retnamma et al. | |
| 2006/0005048 A1 | 1/2006 | Osaki et al. | |
| 2006/0010154 A1 | 1/2006 | Prahlad et al. | |
| 2006/0010227 A1 | 1/2006 | Atluri | |
| 2007/0043956 A1 | 2/2007 | El Far et al. | |
| 2007/0078913 A1 | 4/2007 | Crescenti et al. | |
| 2007/0100867 A1 | 5/2007 | Celik et al. | |
| 2007/0143756 A1 | 6/2007 | Gokhale | |
| 2007/0183224 A1 | 8/2007 | Erofeev | |
| 2007/0288536 A1 | 12/2007 | Sen et al. | |
| 2008/0059515 A1 | 3/2008 | Fulton | |
| 2008/0229037 A1 | 9/2008 | Bunte et al. | |
| 2008/0243914 A1 | 10/2008 | Prahlad et al. | |
| 2008/0243957 A1 | 10/2008 | Prahlad et al. | |
| 2008/0243958 A1 | 10/2008 | Prahlad et al. | |
| 2008/0244177 A1 | 10/2008 | Crescenti et al. | |
| 2009/0055044 A1 | 2/2009 | Oshinsky et al. | |
| 2009/0228894 A1 | 9/2009 | Gokhale | |
| 2009/0248762 A1 | 10/2009 | Prahlad et al. | |
| 2009/0271791 A1 | 10/2009 | Gokhale | |
| 2009/0319534 A1 | 12/2009 | Gokhale | |
| 2009/0319585 A1 | 12/2009 | Gokhale | |
| 2010/0005259 A1 | 1/2010 | Prahlad | |
| 2010/0049753 A1 | 2/2010 | Prahlad et al. | |
| 2010/0094808 A1 | 4/2010 | Erofeev | |
| 2010/0100529 A1 | 4/2010 | Erofeev | |
| 2010/0122053 A1 | 5/2010 | Prahlad et al. | |
| 2010/0131461 A1 | 5/2010 | Prahlad et al. | |
| 2010/0138393 A1 | 6/2010 | Crescenti et al. | |
| 2010/0145909 A1 | 6/2010 | Ngo | |
| 2010/0179941 A1 | 7/2010 | Agrawal et al. | |
| 2010/0205150 A1 | 8/2010 | Prahlad et al. | |
| 2011/0066817 A1 | 3/2011 | Kavuri et al. | |
| 2011/0072097 A1 | 3/2011 | Prahlad et al. | |
| 2011/0119235 A1 | 5/2011 | Crescenti et al. | |
| 2012/0030177 A1 | 2/2012 | Crescenti et al. | |
| 2012/0059797 A1 | 3/2012 | Prahlad et al. | |
| 2012/0089800 A1 | 4/2012 | Prahlad et al. | |
| 2012/0124042 A1 | 5/2012 | Oshinsky et al. | |
| 2012/0124289 A1 | 5/2012 | Kavuri et al. | |

FOREIGN PATENT DOCUMENTS

| | | |
|---|---|---|
| EP | 0341230 | 11/1989 |
| EP | 0381651 | 8/1990 |
| EP | 0 405 926 | 1/1991 |
| EP | 0 467 546 | 1/1992 |
| EP | 0 599 466 | 6/1994 |
| EP | 0670543 | 9/1995 |
| EP | 0717346 | 6/1996 |
| EP | 0 774 715 | 5/1997 |
| EP | 0 809 184 | 11/1997 |
| EP | 0 862 304 | 9/1998 |
| EP | 0 899 662 | 3/1999 |
| EP | 0 981 090 | 2/2000 |
| EP | 0 986 011 | 3/2000 |
| EP | 1 174 795 | 1/2002 |
| JP | H11-102314 | 4/1999 |
| JP | H11-259459 | 9/1999 |
| JP | 2001-60175 | 3/2001 |
| WO | WO 94/17474 | 8/1994 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 99/23585 | 5/1999 |
| WO | WO 01/04756 | 1/2001 |
| WO | WO 2005/050381 | 6/2005 |

OTHER PUBLICATIONS

Jander, M., "Launching Storage-Area Net," Data Communications, US, McGraw Hill, NY, vol. 27, No. 4(Mar. 21, 1998), pp. 64-72.

Weatherspoon H. et al., "Silverback: A Global-Scale Archival System," Mar. 2001, pp. 1-15.

Arneson, David A., "Development of Omniserver; Mass Storage Systems," 1990, pp. 88-93.

Arneson, "Mass Storage Archiving in Network Environments," IEEE, 1998, pp. 45-50.

Cabrera et al., "ADSM: A Multi-Platform, Scalable, Backup and Archive Mass Storage System," Digest of Papers of the Computer Society Conference, IEEE Comp. Soc. Press, vol. Conf. (Mar. 5, 1995), pp. 420-427.

Eitel, "Backup and Storage Management in Distributed Heterogeneous Environment," IEEE, 1994, pp. 124-126.

Rosenblum et al, "The Design and Implementation of a Log-Structure File System," Operating Systems Review SIGOPS, vol. 25, No. 5, New York, US, pp. 1-15 (May 1991).

Jason Gait, "The Optical File Cabinet: A Random-Access File System For Write-Once Optical Disks," IEEE Computer, vol. 21, No. 6, pp. 11-22 (1988) (see in particular figure 5 in p. 15 and the recitation in claim 5).

Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.

Catapult, Inc., Microsoft Outlook 2000 Step by Step, Published May 7, 1999, "Collaborating with Others Using Outlook & Exchange", p. 8 including "Message Timeline."

European Communication in Application No. 01906806.3, issued Sep. 21, 2010, in 6 pages.

http://en.wikipedia.org/wiki/Naive_Bayes_classifier.

International Preliminary Report on Patentability in PCT/US2004/038278 filed Nov. 15, 2004, (Publication No. WO2005/050381) dated May 15, 2006.

International Search Report on Patentability dated Dec. 21, 2000 in PCT/US00/19364 filed Nov. 14, 2000 (Publication No. WO01/04756).

International Search Report, PCT Application PCT/US02/17973, Aug. 22, 2002; 3 pages.

Microsoft, about using Microsoft Excel 2000 files with earlier version Excel, 1985-1999, Microsoft, p. 1.

Supplementary European Search Report, European Patent Application No. 02747883, Sep. 15, 2006; 2 pages.

Toyoda, Fundamentals of Oracle 8i Backup and Recovery, DB Magazine, Japan, Shoeisha, Co., Ltd.; Jul. 2000; vol. 10, No. 4, 34 total pages.

Communication in European Application No. 02 747 883.3, mailed Jul. 20, 2007).

European Examination Report, Application No. 01906806.3-1244, dated Sep. 13, 2006, 3 pages.

European Office Action dated Mar. 26, 2008, EP019068337.

European Office Action dated Apr. 22, 2008, EP02778952.8.

International Search Report and Preliminary Report on Patentability dated Feb. 21, 2002, PCT/US2001/003183.

International Search Report and Preliminary Report on Patentability dated Mar. 3, 2003, PCT/US2002/018169.

International Search Report and Preliminary Report on Patentability dated May 4, 2001, PCT/US2000/019363.

International Search Report and Preliminary Report on Patentability dated Sep. 29, 2001, PCT/US2001/003209.

International Search Report dated Dec. 21, 2000, PCT/US2000/019324.

International Search Report dated Dec. 21, 2000, PCT/US2000/019329.

International Search Report dated Dec. 23, 2003; PCT/US2001/003088.

International Search Report, PCT Application PCT/US02/17973, Aug. 22, 2002; 1 page.

International Search Report, PCT/US2004/038278, dated Feb. 1, 2006.

Japanese Office Action dated Jul. 15, 2008, Application No. 2003/502696.

Supplementary European Search Report dated Sep. 21, 2006, EP02778952.8.

Translation of Japanese Office Action dated Mar. 25, 2008, Application No. 2003-504235.

U.S. Appl. No. 13/485,473, filed May 31, 2012, Prahlad, Anand et al.

* cited by examiner

MODULAR BACKUP AND RETRIEVAL SYSTEM USED IN CONJUNCTION WITH A STORAGE AREA NETWORK

RELATED APPLICATIONS

This application is a continuation of U.S. patent application Ser. No. 11/356,467, filed Feb. 15, 2006, now abandoned, which is a continuation of U.S. patent application Ser. No. 09/610,738, filed Jul. 6, 2000, now U.S. Pat. No. 7,035,880, issued Apr. 25, 2006, which claims the benefit of priority of U.S. Provisional Patent Application No. 60/143,743, filed Jul. 14, 1999, U.S. Provisional Patent Application No. 60/143,744, filed Jul. 14, 1999, and U.S. Provisional Patent Application No. 60/179,345, filed Jan. 31, 2000.

BACKGROUND

1. Field of the Invention

The present invention is directed towards backup systems for computer networks. In particular, the present invention is directed towards the implementation of a distributed, hierarchical backup system with a storage area network (SAN) system.

2. Related Art

Conventional backup devices commonly employ a monolithic backup and retrieval system servicing a single server with attached storage devices. These systems usually control all aspects of a data backup or retrieval, including timing the backup, directing the files to be backed up, directing the mode of the archival request, and directing the storage process itself through attached library media. Further, these backup and retrieval systems are not scalable, and often direct only one type of backup and retrieval system, such as a network backup or a single machine backup.

Due to the monolithic structure of these backup and retrieval systems, a slight change in the operation of any one of the several functional aspects of the backup and retrieval system requires a large amount of effort to upgrade or change the backup and retrieval system, including in some situations, reinstalling the backup and retrieval system in its entirety.

Also, the operation of a backup and retrieval system across a network containing several different types of hardware and operating systems presents significant challenges to an enterprise scale backup including maintaining data coherency, bridging file system protocols, and accessibility issues across multiple hardware and operating system configurations.

Other currently available backup solutions do not address scalability issues, hierarchy issues, and the problems inherent in the storage of different files in a network file system. Many other problems and disadvantages of the prior art will become apparent to one skilled in the art after comparing such prior art with the present invention as described herein.

SUMMARY

A file processor manages data transmission in a computer storage system. The file processor operates as a part of a computing system and may be implemented as programs running on a computational device. A management component module and at least one client component work in conjunction with the file processor for archival purposes such as archival requests. The client component may be implemented as a program running on a computing device. Archival requests include storing data such as a computer file in a location different then the original location of the data. Archival requests may also include retrieval of stored data and may include restoring data to a previous state such as retrieving earlier versions of a file. The computer storage system may be comprised of a media component and a client component that manage functions associated with a backup of a computer storage system.

Another aspect of the invention includes a modular network storage system in which a file processor directs the functions associated with the archival of data over a network. A plurality of backup devices, each having space for the archival of data are directed by a plurality of media components. Each media component is a part of a computing device and is communicatively coupled to one or more of the plurality of the backup devices and the file processor for controlling archival functions of the backup devices in accordance with the direction from the file processor. A plurality of client components each generate archival type requests to the file processor which then provide direction to the plurality of media components for directing the archival functions in accordance with the archival type requests.

The modular network storage system may include a management component that is communicatively coupled to the file processor and the plurality of client devices for coordinating archival functions where the management component is a part of a computing device such as a program running on a computer. The modular network storage system may include a plurality of client devices where each client component is communicatively coupled to one or more of the plurality of client devices and the file processor for communicating the archival type requests from the client devices to the file processor. At least two of the plurality of client devices may run different operating systems. A network storage media may be communicatively coupled to two or more of the plurality of client devices over the network as well as the plurality of backup devices and at least one client device may include a local storage media, wherein the archival functions include reading data from either the network storage media or the local storage media and then writing the data to one of the plurality of backup devices.

A method of the present invention includes providing a file processor, which is communicatively coupled to at least one client component and a plurality of media components; providing a plurality of backup devices, each backup device has physical storage space for performing archival functions; coupling the plurality of media components communicatively with the plurality of backup devices, and with a file processor, wherein each of the media components control the archival functions of one or more backup devices; generating an archival type request, by the client component to the file processor; and directing, by the file processor through the plurality of media components, the backup devices to perform an archival function, in accordance with the archival type request.

DETAILED DESCRIPTION OF THE PREFERRED EMBODIMENTS

Figure 1:
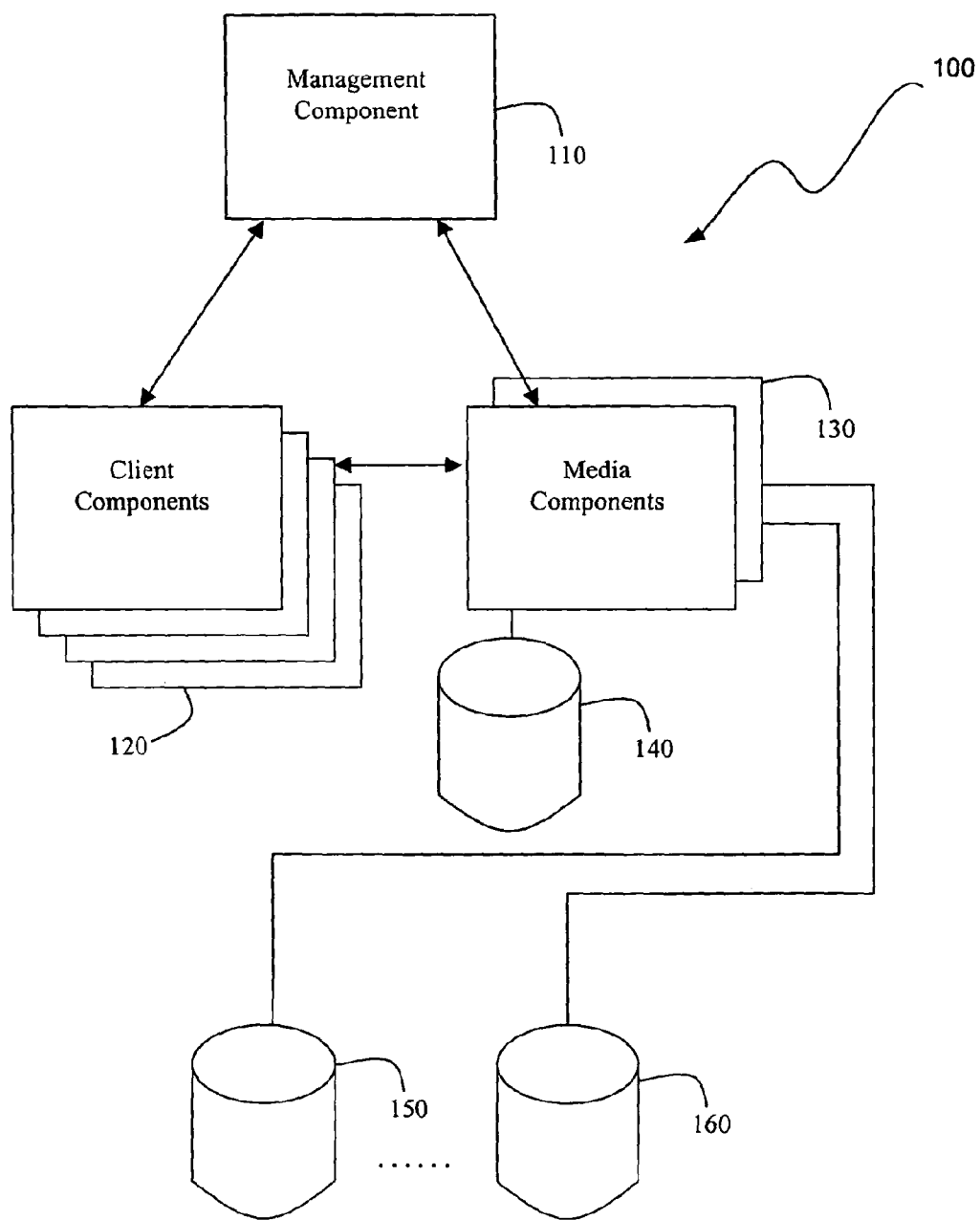
FIG. 1 is a schematic block diagram of a modular backup and retrieval system built in accordance with principles according to the present invention.

FIG. 1 is a schematic block diagram of a modular backup system. A modular backup system 100 comprises three components, a management component 110, one or more client components 120, and one or more media components 130.

Typically, these three components, the management component 110, the client component 120, and the media component 130, may reside on several different machines. For example, the management component 110, the client component 120, and the media component 130 may all reside on a single computing device. Or, the management component 110 and one of the media components 130 may reside on a single computing device with the client component 120 residing on a different computing device. Or, the management component 110 and one of the client components 120 may reside on a single computing device with the media component 130 residing on a different computing device. Or, the media component 130 and the client component 120 may reside on the same computing device with the management component 110 residing on a different computing device. Or, the management component 110, the client component 120, and the media component 130 may all reside on different computing devices.

As shown in FIG. 1, the management component 110 is coupled to the client components 120 and the media components 130. The media components 130 are also coupled to the client components 120.

These components of the management component 110, the client component 120, and the media component 130 are typically software programs running on the respective computing devices. Although the computing devices may not be the same devices, communication should exist between these components, as is demonstrated.

The client component 120 controls the actions and parameters of a backup or retrieval for a particular client computing device. A client computing device is the computing device in need of backup and retrieval assistance. The client components 120 each reside on a client computing device, or are in active communication with the client computing device. The particular client component 120 provides, for a particular client computing device, communication with a management director component 110 regarding such parameters as backup schedules, types of files in the backup schedule, the method of backup or retrieval, and other broad scope backup and retrieval management functions for the client computing device. The particular client component 120 communicates with a particular media component 130 responsible for the actual backup or retrieval function.

The media component 130 controls the actions and parameters of the actual physical level backup or retrieval at the library media containing the archived data. Each media component 130 is responsible for one or more physical backup media devices. As shown in FIG. 1, the media component 130 may be responsible for a single backup device 140, or for a plurality of backup devices 150 through 160. The particular media component 130 directs the data that is the subject of an archival type request to or from, as the case may be, the particular backup devices 140, 150, or 160 that it is responsible for. In the case of a retrieval type archival request, the particular media component 130 directs the retrieved data to a requesting client component 120.

The particular media component 130 also creates a library index for the data contained on the particular backup devices 140, 150, or 160 for which it is responsible for operating. Additionally, the particular media component 130 indexes the location of the archived data and files on the particular associated backup media devices 140, 150, or 160 that it is responsible for operating, and allows the management component 110 and the client component 120 access to certain information about the index entries. The media component 130 uses this library index to quickly and easily locate a particular backed up file or other piece of data on the physical devices at its disposal.

The particular media component 130 either resides on a computing device physically responsible for the operating the library media which the particular media component is responsible for, or it must be in active communication with that computing device. The media component also communicates with the management component 110, since the management component is responsible for the allocation of physical media for backup and retrieval purposes.

The backup devices 140, 150, and 160 can comprise many different types of media, such as massively parallel fast access magnetic media, tape jukebox media, or optical jukebox media devices. The determination of which backup device is to be implemented is determined by several parameters. These include time related frequency of accesses, importance of the backup file or data and urgency of its retrieval, or how long ago the backup was made.

The management component 110 directs many aspects of the backup and retrieval functions. These aspects include scheduling policies, aging policies, index pruning policies, drive cleaning policies, configuration information, keeping track of all running and waiting jobs, allocation of drives, type of backup (i.e. full, incremental, or differential), tracking different applications running on each client, and tracking media. The management component 110 may contain the scheduling information for a timetable of backups for the computing devices. Any number of computing devices might be involved, and the computing devices may be interconnected.

Figure 2:
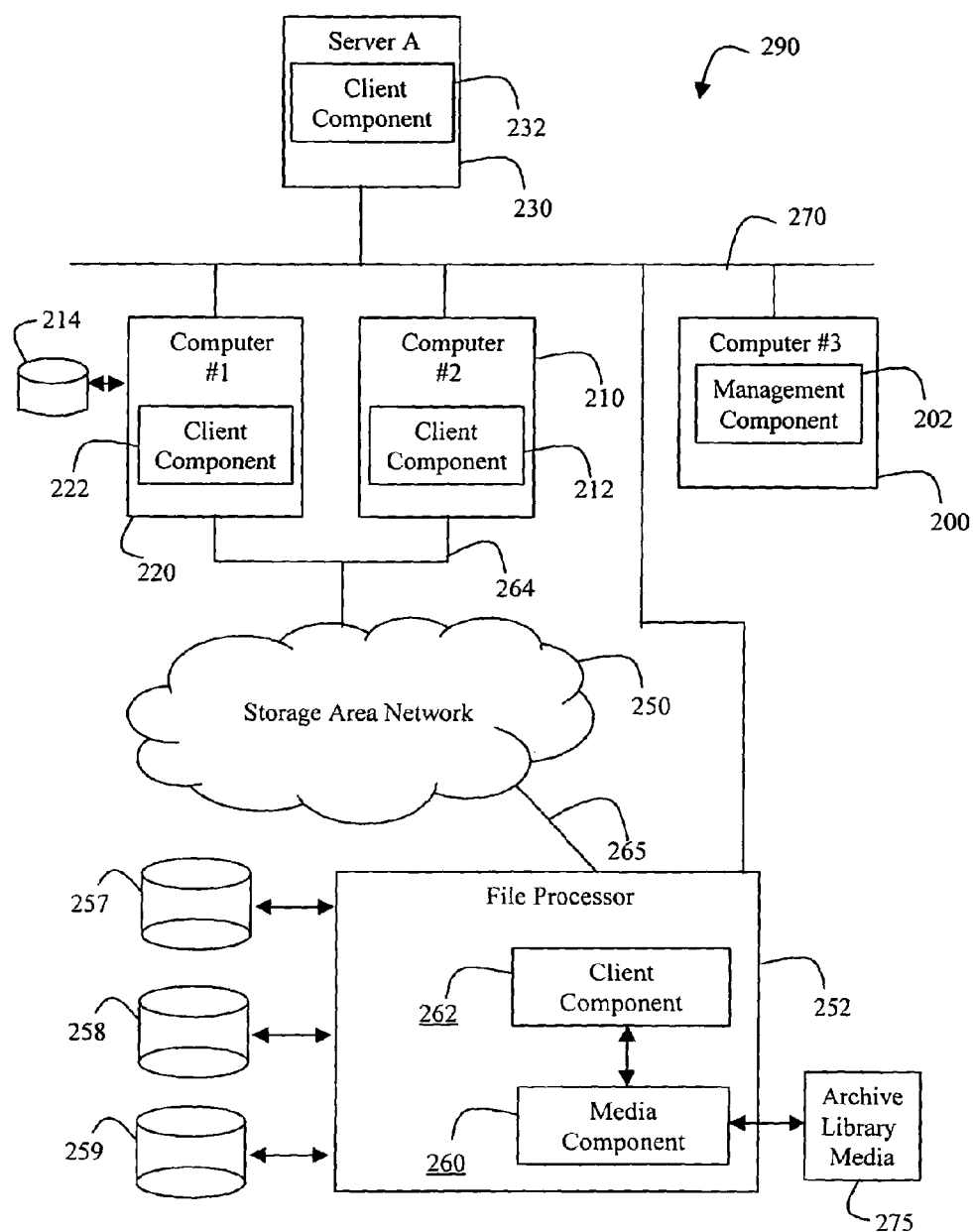
FIG. 2 is a schematic block diagram of a modular backup system working in conjunction with a storage area network (SAN) system according to principles of the present invention.

FIG. 2 is a schematic block diagram of a modular backup system working in conjunction with a storage area network (SAN) system 250. A computing device 200 contains and operates a management component 202, which is responsible for the coordination of backup, storage, retrieval, and restoration of files and data on a computer network system 290. The management component 202 coordinates the aspects of these functions with a client component 212, running on another computing device 210, and a client component 222 running on yet another computing device 220. The computing device 220 also has an attached data storage device 214, to which it can store data and files locally.

The computing devices 210, 220, and 230 are connected to the SAN system 250 via a connection 264, such as a direct fiber channel connection, or a SCSI connection. However, it should be realized that any type of network connection is possible.

The SAN system 250 environment comprises the connection media 264, routers, and associated hubs for the actual data communication functions of the network, and a file processor 252. The elements of the SAN system 250 not explicitly numbered are implied in a remainder of the SAN system 250.

Another computing device 230 contains another client component 232. However, the computing device 230 is connected, through a network 270, to a file processor 252 for interaction with the SAN system 250 through another network 265. This network could be any type of network, such as a LAN operating under a TCP/IP protocol.

The client components 232, 222, or 212 coordinate and direct local backup and retrieval functions on the computing devices 230, 220, and 210, respectively. The management component 202 coordinates and directs the overall network backup of the computer network 290.

The computing devices 210, 220, and 230 can all be different architectures of machines running different operating systems. Hardware systems could include those made by SUN, Hewlett/Packard, Intel based families of processors, and machines based on the RS6000 and PowerPC families of processors, to name a few. Operating systems can include the many flavors of UNIX and UNIX-like operating systems, such as HP/UX, Solaris, AIX, and Linux, to name a few, as well as Windows NT by Microsoft.

The file processor 252 of the SAN system 250 contains a client component 262 and a media component 260. Storage media 257, 258, and 259 are communicatively coupled to the file processor 252 for storage of network files from the computing devices 210, 220, and 230. These storage devices can be magnetic media for fast retrieval, tape media for longer term storage, or optical media for much longer term storage.

The overall SAN system 250 acts as a block access device to the computing devices 210, 220, and 230. Thus, the overall SAN system 250 acts as a virtual media device and centralizes the network file system from the computing devices 210, 220, and 230. As such, true dynamic sharing of the data and files through the SAN system 250 is possible. These data and files are available to the computing devices 210, 220, and 230. The computing devices 210, 220, and 230 present their network file and data requests to the file processor 252 over the SAN network media 264 remainder of the SAN system 250 as they would any other storage media available to that computing device. The file processor 252, working in accordance with its software, interprets the data and file requests from the external computing devices. The file processor 252 then performs the file or data request based on the information it is given, and responds accordingly to the file or data request. The network file system is maintained and operated on solely by the file processor 252 of the SAN system 250. All accesses, writes, reads, and requests for information on any files and/or data under the network file system is handled by the SAN system 250, and in particular the file processor 252.

The file processor 252 keeps track of all the stored files and/or data stored on the media devices 257, 258, and 259. The file processor 252 maintains and presents a file system view of the stored data and/or files to the computing devices 210, 220, and 230 over the remainder of the SAN system 250 and the SAN network media 264. The computing devices 210, 220, and 230, when accessing or inquiring about portions of the network file system, perform these functions by requesting them through the file processor 252 of the SAN system 250.

The SAN system 250 allows access to the files and/or data stored in its storage media, and actually performs all the function of a file system to the attached computing devices 210, 220, and 230. Opening, closing, reading, and writing of data to files and of files themselves actually look and perform like a normal file system to the attached computing devices 210, 220, and 230. These actions are transparent to the computing devices. As such, the SAN system 250 acts and performs as a file system to the rest of the computing devices connected to the file processor 252. Also, from the perspective of the computing devices, each computing device can access and view the data and/or files stored by the file processor 252 of the SAN system 250 as part of a large, monolithic file system.

A client component 262 and a media component 260 can be part of the SAN system 250. These components work in conjunction with other components present in the network environment, including the file processor 252 itself, to make up a network backup and retrieval system for the computer network 290.

In an embodiment of the present invention, the file processor 252 works in conjunction with the management component 202, the media component 260, and the client component 262 for archival type requests, such as those concerned with backup, retrieval, and restoration purposes. The media component 260 acts in conjunction with the management component 202 and/or the client component 262 in a backup and retrieval operation with regards to the network files as stored on the SAN 250.

The management component 202 could, for example, initiate a full backup of the network file system as stored and managed on the SAN system 250. This could be initiated through the network link 270 directly to the client component 262, bypassing the SAN link 264.

Or, the management component 202 could initiate the action through any of the computing devices 210, 220, or 230. This initiation may take place either in a direct request to the SAN system 250 or indirectly to the components 260 and 262 through such methods such as data encapsulation and data bridging. Or, the initiation could be a special file memory request to the SAN system 250, which the file processor 252 interprets to be a particular backup and retrieval instruction.

It may also be possible that the client component 262 requests the backup itself, independently of the media component 260. In either event the client component 262 would manage the functions associated during the backup with the host system, in this case the SAN system 250, such as determining the actual files or data to backup, the level of backup, and other such client machine specific determinations. The data and/or files that need to be backed up would be made available from the network file storage media 257, 258, and 259, wherein the client component 262 turns control over to the media component 260. The media component 260 would then direct the physical storage of the data and/or files on the network file system from the storage media 257, 258, or 259, as the case may be, and onto the library storage media 275. The media component 260 could then perform the indexing functions on the archived data and/or files.

It should be noted that the backup could take several forms. A backup could target data and files on a sector or block write basis, or could be used in a file basis.

In the case of an incremental backup, for example, only those blocks or files that have been altered would be stored for backup and retrieval purposes. In the case of a differential backup, only those changed blocks as contained within an altered file would be stored. Or, other criteria, such as file size, can be used to determine a hybrid backup strategy wherein both files and blocks are saved, depending on the criteria employed and the state of the data and/or files as they exist on the SAN system.

In a restore-type archival operation, a similar method would be employed. Either the media component 260 or the client component 262 may request a restore. In either case, the client component 262 would then perform the managerial tasks associated with the request, as described earlier. Control would then pass to the media component 260 to physically perform the extraction of the stored or archived data and/or files from the library media 275. The client component 262 would then forward the retrieved data and/or files to the requesting device.

Should the requesting device be the SAN system itself, the client component 262 would forward the retrieved data to the SAN system 250, wherein the SAN system 250 could write the data out to the appropriate storage media 257, 258, or 259.

Or, the client component 262 could forward the retrieved data and/or files to the management component 202, wherein the management component 202 routes the requested data and/or files to the particular computing device.

Alternately, the computing device 220 running the client component 222 may request a restore or other archival request for its attached memory media device 214 through the client component 222. The media component 260 could be contacted either as a special media access request to the SAN system 250, or it could access the media component 260 through such methods as data encapsulation over the SAN network 264. Once contacted, if the request was for retrieval or a restore, the media component 260 would collect the appropriate data and/or files and relay the retrieved data and/or files to the computing device 220 through a communication with the SAN system 250. This return communication could be in the form of a SAN communication of a network type file or data, or it could employ the use of data encapsulation or data bridging for the transmittal of the retrieved information.

If the request from the client component 222 is for archiving a file, block, or set of either of the two, the media component 260 could acknowledge the request either directly through a SAN type message from the SAN system 250, or by encapsulating the response in a SAN type message. The client component 222 running on the computing device 220 would then direct the appropriate data or files from the memory media 214 to the media component 260. This again may take place either through a special access protocol recognizable by the SAN system 250 and redirected to the media component 260, or through encapsulating the data sent over the SAN link 264 from the computing device as a SAN-formatted message directed to the media component 260. It should be noted that the management component 202 running on a different computing device could also initiate a backup and retrieval request by the client component 222 through the network 270.

Turning now the computing device 230, the computing device 230 is running a client component 232 that manages its archiving needs. The computing device 230 is not in direct contact with the media component 260 operating on the library storage media 275. A request for an archival action such as retrieval, a restoration, or a backup is made by the client component 232. This request can be initiated either by the management component 202 or by the client component 232 itself. The client component 232 then coordinates and determines the scope of the backup and retrieval request, and accordingly acts to notify the media component 260. This may be accomplished either by a direct request to the SAN system 250 over the SAN link 264 acting as a request for a local backup and retrieval request, in which the SAN system 250 coordinates the backup and retrieval request. Or, this may be accomplished by the routing of a message directly for the media component 260 through use of data encapsulation via the SAN system 250.

If the request is a request for a backup, the client component 232 could then communicate the files and/or data to be archived to the media component 260 in a similar manner. The media component 260 would then perform the requested backup to the media library 275.

If the request is one for a retrieval or restoration, the media component 260 would extract the requested data from the media library 275 and route the data back to the client component 232 which would be responsible for the placement of the data on the computing system 230. This outbound messaging may be accomplished either by direct communication through the SAN system 250, or may be by indirect methods, such as data encapsulation from the media component 260 or the use of data bridging techniques.

Figure 3:
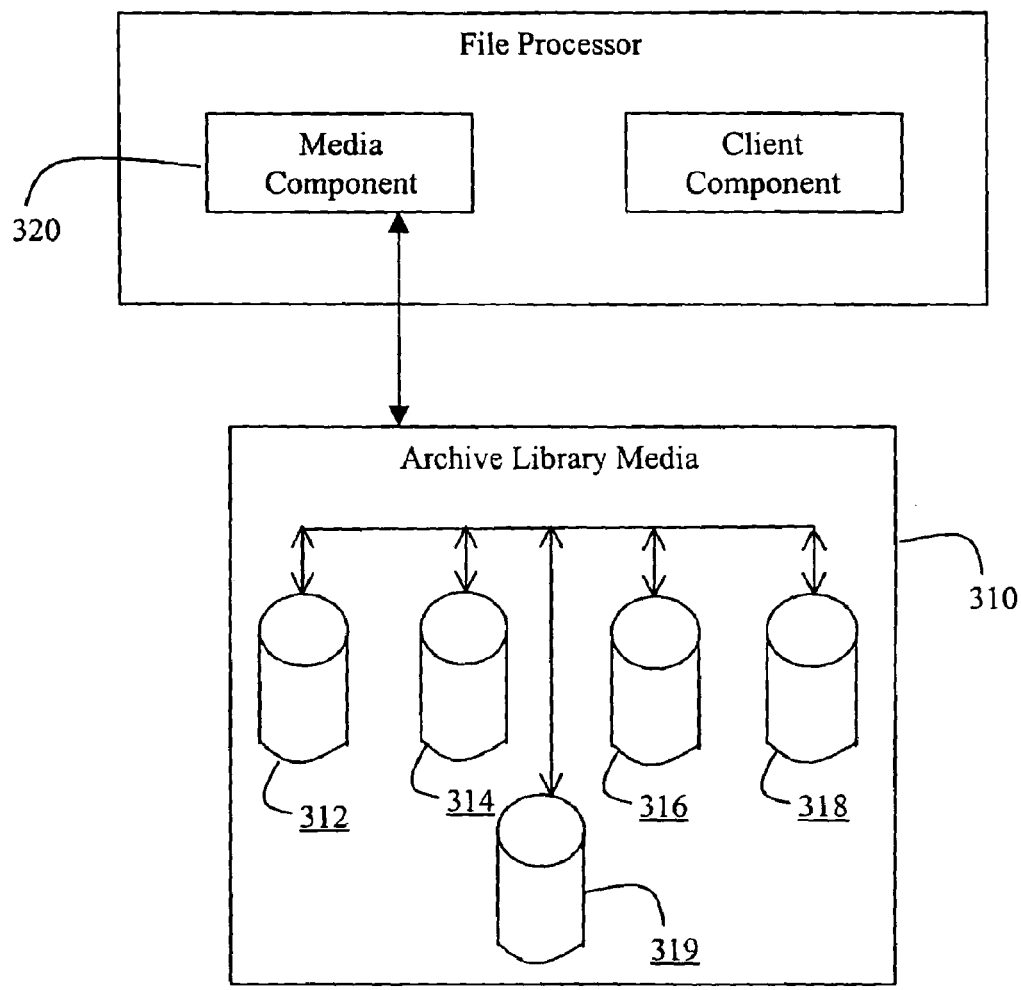
FIG. 3 is schematic block diagram of the interaction of the library media of FIG. 2 with the SAN system.

FIG. 3 is schematic block diagram of the interaction of the library media of FIG. 2 with the SAN system. As shown, a library media 310 controlled by a media component 320 may comprise a number of different storage media, or may just comprise one. In FIG. 3, the library media 310 comprises a fast, alterable random access device 312, a fast, non-alterable random access device 314, a serial device 316, a slow, alterable random access device 318, and a slow, non-alterable random access device 319.

An example of the fast, alterable random access device 312 includes various magnetic media, such as a disc drive, that could include multiple writing surfaces. An example of the fast, non alterable random access device 314 includes a multi disc optical system. An example of the slow, alterable random access device 318 includes jukeboxes containing disc drive cartridges. An example of the slow, non-alterable random access device 314 includes jukeboxes containing optical discs. An example of the serial device 316 could include a magnetic tape cartridge jukebox.

The media component 320 would control the placement of files, sectors, and other backup and retrieval information on the appropriate library media. This placement could be controlled according to the parameters of the backup, such as proximity in date, or whether the archived data is alterable in the archived form. Other parameters to consider could be the relative frequency of requests to the data or to importance of the data as determined by a client component or a management component directing those parameters.

Thus, in the case of differential backups, portions of the archived file may reside across several different media. Older portions may be contained in the device 314, while newer updated versions of that block may be contained in the device 312. Portions that have not changed may still be in other library devices.

In view of the above detailed description of the present invention and associated drawings, other modifications and variations will now become apparent to those skilled in the art. It should also be apparent that such other modifications and variations may be effected without departing from the spirit and scope of the present invention as set forth in this specification.

What is claimed is:

1. A system for directing storage of data in a computer network, the system comprising:

a plurality of client computing devices communicatively coupled to a first network comprising a local area network, each of the plurality of client computing devices comprising a different operating system, wherein each of the plurality of client computing devices further comprises, one or more applications executing thereon, and a client module that controls backup and retrieval of data to and from the corresponding client computing device;

a plurality of storage devices;

a management computing device communicatively coupled to the plurality of client computing devices via the first network, the management computing device being configured to track the one or more applications on each of the plurality of client computing devices and to coordinate storage operations between the plurality of client computing devices and the storage devices;

a file processor executing in one or more computer processors that is communicatively coupled to both the first network comprising the local area network and to a second network comprising a storage area network, the file processor configured to track data transferred from the client computing devices to the plurality of storage devices through the first and second networks, the file processor further configured to communicate with the management computing device via the first network, and to the plurality of client computing devices through the second network, wherein the file processor is configured to,
- track the files that pass through the storage area network for storage on the plurality of storage devices;
- maintain a file system view of data stored in the first and second networks;
- provide to the plurality of client computing devices a view of the data stored on the plurality of storage devices,
- provide to the plurality of client computing devices block-based access to the data stored on the plurality of storage devices, and
- maintain an index of the data stored on the plurality of storage devices; and a media module configured to control physical level storage operations of the data between the plurality of client computing devices and the plurality of storage devices, wherein the management computing device is configured to direct storage operations via the first network by directing data transfers between the one or more of the plurality of client computing devices and the media module via the first network wherein the data transfer occurs over the local area network, and wherein the management computing device is further configured to direct storage operations via the second network by sending a data encapsulated message over the second network to the media module to direct data transfer between the client computing device and the media module via the second network, wherein the data transfer occurs over the storage area network; and an archive library coupled to the file processor, wherein the file processor is configured to copy data from the plurality of storage devices to the archive library and wherein said copying by the file processor is transparent to the plurality of client computing devices.

2. The system of claim 1, wherein the management computing device is further configured to instruct one of the plurality of client computing devices to initiate a storage operation request.

3. The system of claim 1, wherein the plurality of client computing devices are part of a storage area network (SAN).

4. The system of claim 1, wherein the media module executes on the file processor.

5. The system of claim 4, wherein the media module maintains the index of the data stored on the plurality of storage devices.

6. The system of claim 1, wherein the file processor copies the data based on instructions received directly from the management computing device.

7. The system of claim 1, wherein the archive library comprises different types of storage media.

8. A method for directing storage of data in a computer network, the method comprising:
- presenting to a plurality of client computing devices a view of data stored on a plurality of storage devices, each of the plurality of client computing devices comprising a different operating system, and wherein the plurality of client computing devices are in communication with a media module via a first network comprising a local area network;
- instructing, with a management computing device communicatively coupled to the plurality of client computing devices, one of the plurality of client computing devices to initiate a storage operation request;
- receiving via a second network comprising a storage area network the storage operation request, wherein the storage area network is in communication with a file processor that executes in one or more computer processors, and wherein the storage area network is different than the local area network;
- in response to receiving the storage operation request, performing with a media module, block-based storage operations on data stored on at least one of the plurality of storage devices; and
- tracking the files that pass through he storage area network for storage on the plurality of storage devices;
- maintaining with the file processor an index of the data stored on the plurality of storage devices,
- maintaining a file system view of the data stored in the first and second networks with the file processor, and
- wherein the management computing device directs storage operations that bypass the second network by directing data transfers between the one or more of the plurality of client computing devices and the media module via the first network wherein the data transfer occurs over the local area network, and
- wherein the management computing device further directs storage operations via the second network by sending a data encapsulated message over the second network to the media module to direct data transfer between the client computing device and the media module via the second network, wherein the data transfer occurs over the storage area network; and
- copying data with the file processor from the plurality of storage devices to an archive library comprising different types of storage media, wherein said copying is performed transparently with respect to the plurality of client computing devices.

9. The method of claim 8, wherein said copying is performed in response to an instruction received from the management computing device.

10. The method of claim 9, additionally comprising sending said instruction based on a data aging policy maintained by the management computing device.

11. The method of claim 9, additionally comprising sending said instruction by bypassing the storage area network.

12. The method of claim 8, wherein said maintaining is performed by the media module executing on the file processor.

13. The method of claim 8, wherein said presenting is performed by the file processor.

14. The method of claim 8, additionally comprising initiating with the management computing device a backup of a network file system as stored on the plurality of storage devices.

* * * * *

UNITED STATES PATENT AND TRADEMARK OFFICE
CERTIFICATE OF CORRECTION

| | | |
|---|---|---|
| PATENT NO. | : 8,352,433 B2 | Page 1 of 1 |
| APPLICATION NO. | : 12/702716 | |
| DATED | : January 8, 2013 | |
| INVENTOR(S) | : Crescenti et al. | |

It is certified that error appears in the above-identified patent and that said Letters Patent is hereby corrected as shown below:

In the claims

In column 10 at line 18 (approx.), In Claim 8, change "he" to --the--.

Signed and Sealed this
Fourth Day of February, 2014

Michelle K. Lee
*Deputy Director of the United States Patent and Trademark Office*